United States Patent [19]

Klebe et al.

[11] 4,194,025

[45] Mar. 18, 1980

[54] PROCESS FOR THE PRODUCTION OF STABILIZED SODIUM PERCARBONATE

[75] Inventors: Hans Klebe; Gerd Knippschild, both of Rheinfelden; Hubert Schuster, Karsau-Beuggen, all of Fed. Rep. of Germany

[73] Assignee: Deutsche Gold- und Silber-Scheideanstalt vormals Roessler, Frankfurt, Fed. Rep. of Germany

[21] Appl. No.: 16,729

[22] Filed: Mar. 1, 1979

[30] Foreign Application Priority Data

Oct. 3, 1978 [DE] Fed. Rep. of Germany ....... 2810379

[51] Int. Cl.$^2$ .............................................. C11D 7/54
[52] U.S. Cl. ..................................... 427/215; 252/99; 252/186
[58] Field of Search ................... 427/213, 215; 252/99, 252/186; 428/402, 403

[56] References Cited

U.S. PATENT DOCUMENTS

| | | | |
|---|---|---|---|
| 3,161,597 | 12/1964 | Young | 252/99 |
| 3,449,254 | 5/1969 | Suiter | 252/99 |
| 3,640,885 | 2/1972 | Rhees | 252/99 |
| 3,650,961 | 3/1972 | Hudson | 252/99 |
| 3,951,838 | 4/1976 | Yates | 252/99 |
| 3,979,318 | 9/1976 | Tokiwg | 252/99 |
| 4,156,039 | 5/1979 | Klebe | 427/215 |

*Primary Examiner*—Sam Silverberg
*Attorney, Agent, or Firm*—Cushman, Darby & Cushman

[57] ABSTRACT

There are prepared sodium percarbonate particles comprising a sodium percarbonate nucleus encased in a layer of a mixture of dehydrated sodium perborate and sodium silicate prepared by spraying the sodium percarbonate with a supersaturated solution of sodium perborate and a sodium silicate solution and drying to at least partially remove the added water.

10 Claims, No Drawings

PROCESS FOR THE PRODUCTION OF STABILIZED SODIUM PERCARBONATE

BACKGROUND OF THE INVENTION

This invention is related to the invention described and claimed in our Klebe, et al copending application Ser. No. 837,262 filed Sept. 27, 1977, now U.S. Pat. No. 4,156,039. The entire disclosure of the copending application is hereby incorporated by reference and relied upon.

The use of sodium percarbonate as a bleaching agent alone or in washing agents is of increasing interest since the washing process is increasingly carried out at lower temperatures down to as low as room temperature.

In contrast to sodium perborate tetrahydrate ($NaBO_2 \cdot H_2O_2 \cdot 3H_2O$) (theoretical active oxygen = 10.4%) sodium percarbonate has the advantage of greater solubility at 20° C. and a greater active oxygen content (theoretical active oxygen = 15.3%). However, it has the severe disadvantage that it has very little storage stability in a non dry atmosphere. Thus, the slight amounts of moisture which are present already in the atmosphere and/or in the washing agent are sufficient to bring about the decomposition of the percarbonate.

Especially in warmer zones, where a higher temperature prevails, the decomposition once initiated progresses rapidly.

This problem was known early and therefore for a long time there have been efforts to increase the storage stability of sodium percarbonate in various ways.

Thus, there has been attempted the obtaining of increased stability with the help of aerosols such as silica aerosols (German Pat. No. 870,092).

Also, by the addition of benzoic acid the stability should be increased (German OS No. 1,767,796).

The additives were added either during the production of the percarbonate or in connection with the production of the finished product.

It has already been tried to obtain a stable product by using stabilizers and complex formers which eliminate the impurities of the added soda or the impurities which appear during the process. (German OS No. 2,234,135).

Another idea which has been tried repeatedly is to protect the percarbonate particles by encasing with a protective layer before the decomposition influences take effect. Thus, according to French Pat. No. 893,115 there have been used natural or synthetic resins, or according to German OS No. 2,511,143 polyethylene glycol, or there have been used copolymers in which one of the monomers was vinyl chloride or vinylidene chloride (German OS No. 2,402,392 and 2,403,393).

There has also been proposed encasing with a sodium silicate solution (British Pat. No. 174,891) or a mixture of alkali or alkaline earth silicate and silicoflouride (German OS No. 2,511,143) or an aqueous sol of silicates (Belgian Pat. No. 820,741).

However, it is indicated that the stability is only retained if the storage is in dry air at 20° C.

In any case, however, whatever the reason there was always present so much moisture that the decomposition of the percarbonate began, the storage temperature increased due to the heat of decomposition which accelerated the further decomposition of the percarbonate as did the water obtained from the hydrogen peroxide decomposition.

Thus, there occur active oxygen losses of 40% and more within 15 days if the stability test is carried out at 40° C. and 80% relative air humidity (German OS No. 2,511,143).

The object of the invention therefore is the production of a percarbonate relatively stable in a moist and warm environment, whose loss of activity in the same type of environment is still comparatively small and which retains its good speed of solubility after the stabilization.

In Klebe, et al U.S. application Ser. No. 837,262 filed Sept. 27, 1977 and related published German application P26 51 442.1-41 there is described stabilized sodium percarbonate particles comprising a sodium percarbonate nucleus encased in a layer of a mixture of dehydrated sodium perborate and sodium silicate prepared by applying to the sodium percarbonate an aqueous sodium silicate solution and then applying to the wet sodium percarbonate particles dehydrated sodium perborate. The dehydrated sodium perborate and sodium silicate can be mixed with each other.

SUMMARY OF THE INVENTION

The present invention is directed to a novel process of preparing stable sodium percarbonate particles comprising a sodium percarbonate nucleus encased in a layer of a mixture of dehydrated sodium perborate and sodium silicate.

This sodium percarbonate particle generally contains 13-15.5% of active oxygen. However, there are included in the particles of the invention also those with a lower active oxygen content down to 11% for example. This is of interest under favorable storage conditions, i.e., lower temperatures and less air moisture and at higher washing temperatures of 60° C. and above.

This type of sodium percarbonate particle generally contains 8-15% of active oxygen.

The sodium percarbonate particles of the invention depending on the apparatus used for their production have a spherical or nearly spherical shape and are present in a size from dust up to 2 mm.

It goes without saying there are also included as suitable percarbonate particles those which depending on the degree of purification of the starting components likewise contain these impurities.

As sodium percarbonate there can be used those produced by known processes, either directly from the process of production with still adhering mother liquor, or dry sodium percarbonate, in any case in a particle size from dust to 1.00 mm.

As sodium silicate there can be used for example sodium metasilicate ($Na_2SiO_3$), sodium disilicate ($Na_2Si_2O_5$) and sodium ortho silicate ($Na_4SiO_4$). A preferred silicate is sodium metasilicate or dissolved silicate, e.g. in the form of waterglass. An amount of sodium silicate corresponding to 0.1–1% $SiO_2$ in the sodium percarbonate particle is normally sufficient. For particularly high stability requirements the sodium percarbonate particles can even contain up to 5 weight % $SiO_2$.

However, it also is possible to observe a stabilization effect with an amount of silicate corresponding to 0.05 weight % $SiO_2$. A favorable amount for the $SiO_2$ content of the particle is 0.5–1.0 weight %.

As stated according to Klebe, et al U.S. application Ser. No. 837,262 (and related published German application P26 51 442.1-41) it is known to produce sodium percarbonate particles whose nucleus consists of sodium percarbonate but which is encased in a layer of dehydrated sodium perborate and a sodium silicate.

In further development of a process for preparing such sodium percarbonate particles it has been found that these particles can be prepared in a much simpler manner industrially if sodium percarbonate is sprayed with a supersaturated sodium perborate solution and then dried, whereby the water introduced is either partially or completely removed.

The encasing layer after drying generally contains 14 to 83% of the dehydrated sodium perborate based on the total weight of dehydrated sodium perborate and sodium silicate.

The term "dehydrated sodium perborate" includes those sodium perborates which based on the formula $NaBO_2.H_2O_2.3H_2O$ for sodium perborate tetrahydrate contain less than 54 grams of water per mole. The drying can be such that the perborate is either partially or entirely dehydrated. Thus there can be dehydration to obtain sodium perborate having at least 15% active oxygen content, e.g., 15.2–15.8% active oxygen.

As "introduced water" there is considered only that water entrained with the perborate and silicate in the case where one starts with dry percarbonate.

However, if there is employed moist, above all centrifuge wet percarbonate, which has a certain important industrial simplication, then there must be considered this water protion in the subsequent spraying with perborate and silicate solution.

The total amount of water to be sprayed on cannot exceed a specific amount which is easily determinable by a preliminary test.

Otherwise there is the danger that an undesired strong agglomerization takes place.

As "supersaturated sodium perborate solution" there is understood solutions which contain 50–500 grams of sodium perborate tetrahydrate per liter of solution e.g., at 40°–60° C.

Preferably this supersaturated solution is produced in situ from the corresponding amounts of sodium metaborate solution and hydrogen peroxide, see Example 1.

It is also very favorable not to add the two solutions separately, namely the supersaturated sodium perborate solution and the sodium silicate solution but to spray the mixture on the sodium percarbonate, likewise see Example 1.

The spraying occurs in customary apparatus such as revolving drums, granulating plates and screw extruders.

After each spraying process the water introduces is either partially or completely removed by known drying processes.

The dry or moist sodium percarbonate, however, can also be added as well as a fluidized material. To form the fluidized bed there can be used inert gases such as air, nitrogen and carbon dioxide.

Then the above mentioned solutions can be individually or as a mixture spray on the sodium percarbonate which is in fluidized motion.

As the reactor there can be used all apparatus known for fluidized bed reactions.

The sodium silicate solutions, which can be produced either from pure or industrial silicates have an $SiO_2/Na_2O$ weight ratio of from 3.2 to 3.8:1.

The spraying with supersaturated perborate solution and sodium silicate solution and the subsequent drying is continued until the desired degree of encasement is attained, i.e. thus until at least a complete encasement is present and therewith there results protection from moisture. The degree of encasement can be established by an analysis of a layer.

The stability of the percarbonate particles corresponds about to that of the particles of Klebe, et al U.S. patent application Ser. No. 837,262 and related German No. P 26 51 442.1-41. It was determined by a modified climate test, see the climate test described at the end of the specification.

The drying or dewatering of the encased particles was carried out in a refrigerator at the temperatures and times given above. Thereby there was formed in the encasement dehydrated sodium perborate.

DESCRIPTION OF THE PREFERRED EMBODIMENT

Unless otherwise indicated, all parts and percentages are by weight.

The composition can comprise, consist essentially of or consist of the materials set forth. Most perferably the composition consists essentially of or consists of such materials. The process can comprise, consist essentially of or consist of the steps set forth.

The invention will be further explained in the following example.

NaPC = sodium percarbonate
Oa = active oxygen
rd.L.F = relative humidity
pb-MH = sodium perborate monohydrate

EXAMPLE 1

In a revolving drum (diameter = 250 mm, height = 250 mm) which contained at the same intervals 4 driving ribs 15 mm in width, there were present at a pitch of 15° and a rotating speed of 30 rpm, 1,000 grams of centrifuged wet sodium percarbonate.

100 ml of a sodium metaborate solution (1 mole of $NaBO_2$/liter of solution) were mixed directly before spraying with 37.7 ml of $H_2O_2$ solution (70 weight % $H_2O_2$) and 40.8 grams of water glass (38° Be). This sprayable solution was sprayed on the percarbonate in three equal portions.

Between the spraying processes the test product was dried in the drying oven at about 60° C. for about 30 minutes, as a result of which dehydrated perborate was formed in the encasing layer.

| | | |
|---|---|---|
| Active Oxygen: | | 13.40% |
| $SiO_2$: | | 2.2% |
| $B_2O_3$: | | 0.87% |
| $CO_2$: | | 26.36% |
| $Fe_2O_3$: | | 0.004% |
| Bulk density: | | 0.940 kg/l |
| Sieve on | 0.8 mm: | 10% |
| | 0.5 mm: | 50% |
| | 0.4 mm: | 13% |
| | 0.2 mm: | 24% |
| | 0.1 mm: | 3% |
| Residue | | 0% |

| | NaPc-Starting Weight Unstabilized | Stab. NaPc |
|---|---|---|
| Oa = decomposition at + 30° C. and 92.9% rel. humidity | | |
| after 4 days % | 20.2 | 3.6 |
| after 7 days % | 41.8 | 8.2 |
| after 10 days % | 58.7 | 25.1 |

Investigation of Sodium Percarbonate Climate Test at 30° C. and 92.9% Relative Humidity 1. Apparatus:
    drying oven
    Desiccator (Diameter 150 mm, height 150 mm)
    Weighing glass (Diameter 35 mm, height 30 mm)
2. Reagents:
    N/4 $KMnO_4$ solution
    $H_2SO_4$ stock solution
    $NH_4H_2PO_4$
3. Carrying Out of the Tests For each test series there were prepared 3 desiccators in which the materials under investigation were stored for 4, 7 or 10 days. There were filled into the provided desiccators 760 ml of saturated $NH_4H_2PO_4$ solution having a solid phase.

This solution guaranteed at 30° C. a relative humidity of 92.9%.

Each desiccator was now loaded with 10 weighing glasses in which there were provided 2 grams±0.01 grams of material per weighing glass. One weighing should contain as much as possible a comparison material (e.g., not stabilized sodium percarbonate). If there are lessthan 9 different samples for a series then the number of samples per desicattor always expanded by double or multiple determination to 10.

After running the investigation for 4, 7 or 10 days in each case one of the desiccators is withdrawn from the drying oven, the weighing glass back weighed and the total sample used as weighed portion for the determination of the residual active oxygen.

4. Calculation of the Relative Retention or Decomposition of Active Oxygen:

$$\frac{g\ Oa\ \text{initially} - g\ Oa\ \text{after standing}}{g\ Oa.\ \text{initially}} \times 100 = Oa - \text{loss}$$

or simplified $$\frac{ml\ KMnO_4\ \text{for starting material} - ml\ KmmO_4\ \text{for product}}{ml\ KmnO_4\ \text{for starting material}} \times 100 = Oa - \text{loss}$$

What is claimed is:

1. A process for preparing sodium percarbonate particles comprising a sodium percarbonate nucleus and an encasing layer comprising dehydrated sodium perborate containing less than 54 grams of water per mole and sodium silicate comprising spraying a supersaturated aqueous sodium perborate solution and an aqueous sodium silicate solution on sodium percarbonate particles and then drying to at least partially remove the water.

2. A process according to claim 1 wherein the sodium percarbonate employed contains 1-10 weight % water.

3. A process according to claim 2 wherein the sodium silicate solution employed contains $SiO_2$ and $Na_2O$ in the weight ratio of 3.2 to 3.8:1.

4. A process according to claim 1 wherein the sodium silicate solution employed contains $SiO_2$ and $Na_2O$ in the weight ratio of 3.2 to 3.8:1.

5. A process according to claim 1 wherein the supersaturated solution contains sodium perborate in an amount equivalent to 50 to 500 grams of sodium perborate tetrahydrate.

6. A process according to claim 5 wherein the aqueous sodium perborate and aqueous sodium silicate are sprayed together as a single solution onto the sodium percarbonate particles.

7. A process according to claim 5 wherein the amount of sodium silicate sprayed is such as to provide an $SiO_2$ content of 0.05 to 5% in the particles.

8. A process according to claim 5 wherein the total content of active oxygen in the particles is 11 to 15.5%.

9. A process according to claim 5 wherein the encasing layer consists essentially of at least partially dehydrated sodium perborate and sodium silicate.

10. A process according to claim 5 wherein the supersaturated sodium perborate and sodium silicate solutions are used in amounts that the encasing layer contains 14 to 83% of the dehydrated sodium perborate based on the total weight of dehydrated sodium perborate and sodium silicate.

* * * * *